United States Patent
Banda et al.

(10) Patent No.: US 9,601,971 B2
(45) Date of Patent: Mar. 21, 2017

(54) COOLING DEVICE FOR COOLING A WINDING BRAID OF AN ELECTRICAL MACHINE AND METHOD FOR RETROFITTING THE ELECTRICAL MACHINE WITH THE COOLING DEVICE

(75) Inventors: Marcus Banda, Erfurt (DE); Zhiyun Chen, Erfurt (DE); Olaf Michelsson, Arnstadt (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 556 days.

(21) Appl. No.: 14/009,384

(22) PCT Filed: Mar. 20, 2012

(86) PCT No.: PCT/EP2012/054860
§ 371 (c)(1),
(2), (4) Date: Nov. 5, 2013

(87) PCT Pub. No.: WO2012/139858
PCT Pub. Date: Oct. 18, 2012

(65) Prior Publication Data
US 2014/0054989 A1 Feb. 27, 2014

(30) Foreign Application Priority Data
Apr. 15, 2011 (EP) .................... 11162657

(51) Int. Cl.
*H02K 9/04* (2006.01)
*H02K 15/00* (2006.01)
(Continued)

(52) U.S. Cl.
CPC .................. *H02K 9/04* (2013.01); *H02K 5/20* (2013.01); *H02K 15/00* (2013.01); *H02K 3/24* (2013.01); *Y10T 29/49009* (2015.01)

(58) Field of Classification Search
CPC .. H02K 9/04; H02K 9/02; H02K 9/06; H02K 9/10; H02K 9/12; H02K 15/00
(Continued)

(56) References Cited

U.S. PATENT DOCUMENTS

| | | | | |
|---|---|---|---|---|
| 4,442,371 A | * | 4/1984 | Utsunomiya | H02K 9/00 310/260 |
| 6,188,153 B1 | * | 2/2001 | Hokanson | H02K 9/005 310/52 |
| 2011/0298316 A1 | * | 12/2011 | Bradfield | H02K 9/19 310/58 |

FOREIGN PATENT DOCUMENTS

| CH | 648439 A5 | 3/1985 |
|---|---|---|
| CN | 1448003 A | 10/2003 |

(Continued)

*Primary Examiner* — Michael Andrews

(57) ABSTRACT

A cooling device for cooling an air-permeable winding braid of an electrical machine is provided. The cooling device includes a baffle and a fan, which is arranged for blowing a stream of cooling air substantially perpendicularly onto a first surface portion of one side of the wind braid, wherein, in the region of a second surface portion of the side of the winding braid, arranged alongside the first surface portion, the baffle is arranged substantially parallel to and that a distance from the surface of the second surface portion such that a partial stream of the stream of cooling air is formed in the channel that is formed by the baffle and the second surface portion, and so, on the side of the winding braid that is opposite from the first-mentioned side, the other partial stream of the stream of cooling air, penetrating the winding braid, flows away from the winding braid without any return flow.

11 Claims, 3 Drawing Sheets

(51) Int. Cl.
*H02K 5/20* (2006.01)
*H02K 3/24* (2006.01)

(58) Field of Classification Search
USPC ... 310/58, 52, 59, 60 R, 62, 63, 260; 29/596
See application file for complete search history.

(56) References Cited

FOREIGN PATENT DOCUMENTS

| | | | |
|---|---|---|---|
| CN | 1881749 A | 12/2006 | |
| DE | 3242018 A1 | 6/1983 | |
| DE | 19549204 A1 | 7/1997 | |
| DE | 10247310 A1 | 4/2004 | |
| DE | 102005045491 A1 | 4/2007 | |
| JP | 2007135306 A | 5/2007 | |
| WO | WO 2008000642 A1 | 1/2008 | |

* cited by examiner

COOLING DEVICE FOR COOLING A WINDING BRAID OF AN ELECTRICAL MACHINE AND METHOD FOR RETROFITTING THE ELECTRICAL MACHINE WITH THE COOLING DEVICE

CROSS REFERENCE TO RELATED APPLICATIONS

This application is the US National Stage of International Application No. PCT/EP2012/054860 filed Mar. 20, 2012 and claims benefit thereof, the entire content of which is hereby incorporated herein by reference. The International Application claims priority to the European Patent Office application No. 11162657.8 EP filed Mar. 15, 2011, the entire contents of which is hereby incorporated herein by reference.

FIELD OF INVENTION

The invention relates to a cooling device for cooling an air-permeable winding braid of an electrical machine, to the electrical machine comprising the cooling device, and to a method for retrofitting the electrical machine with the cooling device.

BACKGROUND OF INVENTION

An electrical machine, for example a generator, comprises a stator with a stator winding. The stator winding is conventionally formed by winding conductors, wherein the winding conductor is formed into an air-permeable winding braid. The stator is cylindrical, wherein the stator winding comprises a winding head at the end face. During operation of the generator, ohmic losses are produced in the stator winding and are conventionally dissipated from the generator by means of a cooling device. In particular, there is a risk due to the ohmic losses of overheating in the region of the end crown connection of the winding head, whereby high demands are placed on the cooling device for cooling the winding head in the region of the end crown connection.

As a cooling device, an air cooler is known that comprises an axial fan by means of which cooling air is conveyed axially into the housing in order to cool the stator winding. The cooling air flows through the winding braid, whereby heat is dissipated from the winding braid due to convection effects. In this case, it is problematic however that a hotspot of the winding braid may develop, in particular in the region of the end crown connection, whereby there is a risk of thermal overload of the winding braid in the region of the end crown connection.

SUMMARY OF INVENTION

The object of the invention is to create a cooling device for cooling an air-permeable winding braid of an electrical machine, an electrical machine comprising the cooling device, and a method for retrofitting the electrical machine with the cooling device, wherein the winding braid and therefore the electrical machine are cooled effectively.

The cooling device according to the invention for cooling an air-permeable winding braid of an electrical machine comprises a baffle and a fan, which is arranged to blow a stream of cooling air substantially perpendicularly onto a first surface portion of one side of the winding braid, wherein, in the region of a second surface portion of the side of the winding braid, said second surface portion being arranged beside the first surface portion, the baffle is arranged substantially parallel to and at a distance from the surface of the second surface portion in such a way that a partial stream of the stream of cooling air is formed in the channel that is formed by the baffle and the second surface portion and therefore, on the side of the winding braid that faces away from the first-mentioned side, the other partial stream, penetrating the winding braid, of the stream of cooling air flows away from the wining braid without any return flow. The electrical machine comprises a stator and the cooling device, wherein the winding head of the stator comprises the winding braid.

The winding braid comprises an end crown connection, and the surface of the baffle is preferably formed in such a way that the channel has a cross section minimum in the region of the end crown connection. Since, at the end crown connection, the winding braid is subject to high thermal load during operation of the electrical machine, it is advantageous for the stream of cooling air to flow through the channel at a high speed obtained by means of the cross section minimum, whereby the cooling of the region of the end crown connection of the winding braid is effective as a result of corresponding convection effects.

The method according to the invention for retrofitting an electrical machine with the cooling device comprises the following steps: providing an existing electrical machine with a housing, a fan, which is arranged a blow a stream of cooling air substantially perpendicularly onto a first surface portion of one side of the winding braid, and a stator, wherein the winding head of the stator comprises an air-permeable winding braid; installing in the housing a profiled member comprising a baffle, wherein, in the region of a second surface portion on said side of the winding braid, said second surface portion being arranged beside the first surface portion, the baffle is arranged substantially parallel to and at a distance from the surface of the second surface portion in such a way that a partial stream of the stream of cooling air is formed in the channel that is formed by the baffle and the second surface portion, and therefore, on the side of the winding braid that faces away from the first-mentioned side, the other partial stream, penetrating the winding braid, of the stream of cooling air flows away from the winding braid without any return flow.

The stream of cooling air conveyed by the fan impacts substantially perpendicularly against the first surface portion on the first-mentioned side of the winding braid. Since the winding braid is air-permeable, a part of the stream of the cooling air can penetrate the winding braid. The flow through the winding braid is subject to flow resistance, whereby a pressure drop is to be observed in the direction in which air flows through the winding braid. When the stream of cooling air impacts against the winding braid, one partial stream swerves and flows along the surface of the winding braid, wherein the other partial stream of the cooling stream penetrates the winding braid. The partial stream flowing along the surface of the winding braid enters the channel and is guided by the baffle substantially parallel to the surface of the second surface portion of the winding braid. Due to the continuity condition, the flow rate of the partial stream in the channel is determined by the distance between the baffle and the second surface portion. In accordance with the invention, the distance between the baffle and the second surface portion, and therefore the width of the channel, is to be selected such that a formation of a return flow area when the partial stream penetrating the winding braid exits is prevented on the other side of the winding braid that faces away from the first-mentioned side. This is achieved in that, with an accordingly high speed level and an accordingly high mass flow rate of the partial stream in the channel, the partial stream when exiting from the channel has high kinetic energy, in such a way that a return flow area on the cooling air exit side of the winding braid cannot form. If, in contrast thereto, the speed level in the channel or the mass flow rate and therefore the kinetic energy of the partial stream exiting from the channel were too low, turbulence for example could thus be formed and driven by the partial stream exiting through the winding braid and, in the form of eddying areas, could hinder a dissipation of heat from the winding braid through the stream of cooling air. Since, due to the cooling device according to the invention, the formation of eddying areas at the winding braid is prevented, the winding braid is cooled effectively by the cooling device.

It is preferable for the contour of the surface of the baffle that faces the winding braid to be based on the contour of the second surface portion on the first-mentioned side of the winding braid. The speed level over the flow length in the channel is thus approximately constant, whereby the dissipation of heat from the winding braid is substantially uniform along the channel. In addition, it is preferable for the fan to comprise a fan casing, by means of which the fan is encased and in which the stream of cooling air is conveyed by the fan, and for the baffle to comprise an inlet profile portion, which is arranged between the fan casing and the surface of the baffle facing the winding braid, such that a partial stream of the cooling stream is deflected by the inlet profile portion into the channel without transfer. The stream of cooling air is thus guided with little loss from the fan casing to the channel, wherein an accordingly advantageously high speed level is present at the channel entry. In addition, any turbulences in the inflow region are suppressed and would otherwise lead to a reduction of the stream of cooling air, whereby the efficacy when cooling the winding braid would be reduced.

The cooling device preferably comprises a profiled member, which comprises the baffle. The profiled member is preferably annular. Furthermore, the profiled member is preferably formed in a manner segmented over the periphery. In addition, the profiled member is preferably formed so as to be divisible in its axial direction. The profiled member is preferably produced from a plastic having a temperature resistance of more than 80° C.

The profiled member could preferably be produced from a polyurethane foam, which has a temperature resistance up to approximately 120° C. In addition, the profiled member could be produced from polyester, wherein the profiled member is hollow. The segmented embodiment of the profiled member and/or the embodiment of the profiled member divisible in the axial direction is/are advantageous in terms of assembly thereof.

The electrical machine preferably comprises a housing with the baffle. The housing is thus advantageously formed with the baffle, wherein the baffle is integrated in the housing. The electrical machine is preferably a generator. In addition, it is preferable, with the method for retrofitting the existing electrical machine, for the profiled member to be secured to the housing.

BRIEF DESCRIPTION OF THE DRAWINGS

A preferred embodiment of a generator according to the invention will be explained hereinafter on the basis of the accompanying schematic drawings, in which.

DETAILED DESCRIPTION OF INVENTION

Figure 1:
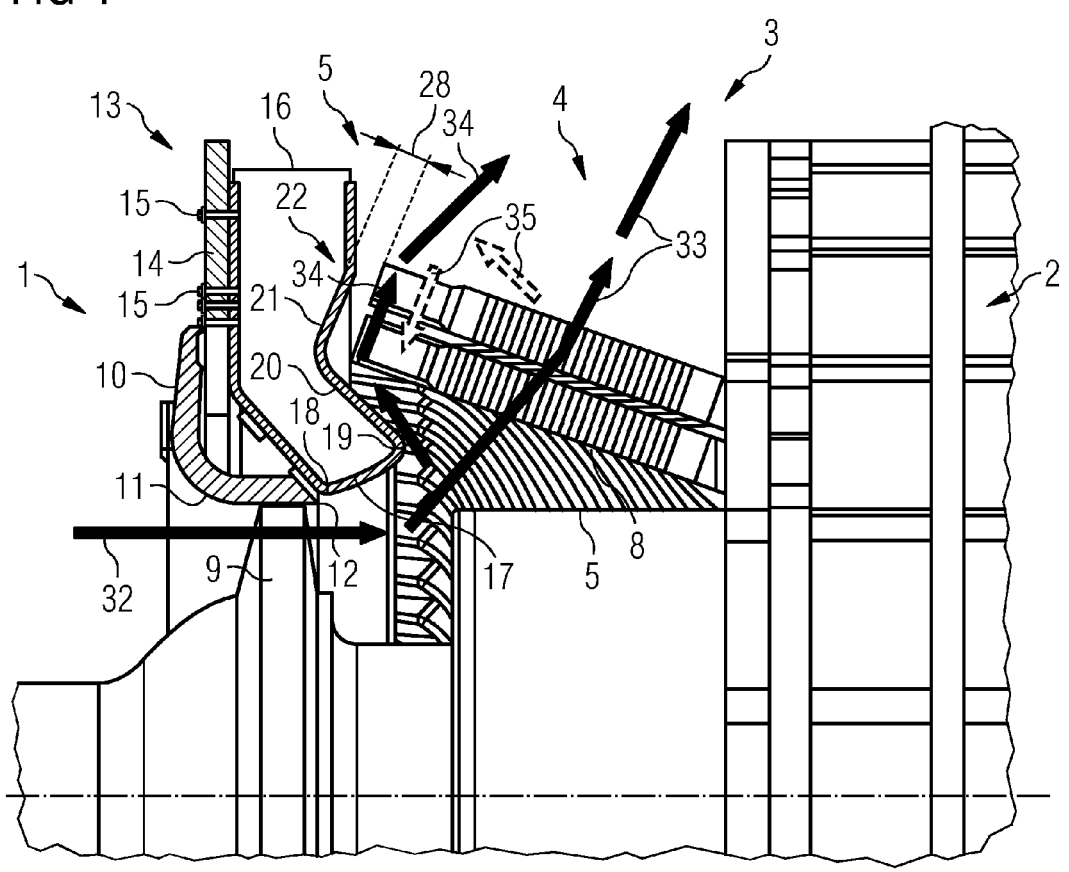
FIG. 1 shows a longitudinal sectional view in the end face region of the generator.
Figure 2:
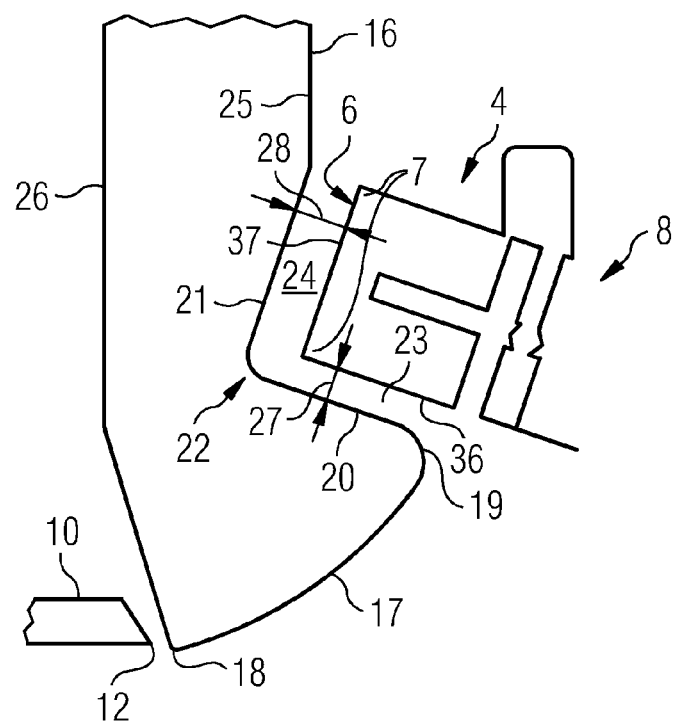
FIG. 2 shows a detail of a profiled member section from FIG. 1.

As can be seen from FIGS. 1 to 6, a generator 1 comprises a stator 2, which is equipped with a stator winding, which is formed by an air-permeable winding braid 3. The stator 2 with its stator winding is formed rotationally symmetrically about the machine axis of the generator 1, wherein, at its end face, the winding braid 3 comprises a rotationally symmetrical winding head 4. The winding braid 3 is formed by a winding conductor 5 or a plurality winding wires 5, wherein the winding conductors 5 or the winding wires 5 are wound to form the winding braid 3. The winding head 4 forms an end face 6 of the winding braid 3, on which an end crown connection 7 and an involute 8 of the stator winding are arranged.

The generator 1 is air-cooled, wherein a fan 9 is provided for this purpose. The fan 9 comprises a blade wheel, which is rotatable about the machine axis of the generator 1 and is formed by a plurality of identically shaped axial blades arranged equidistantly over the periphery. The axial blades are encased on the radially outer side by a fan casing 10, which comprises a trumpet-shaped inlet 11 upstream of the fan 9. Downstream of the fan 9, the fan casing 10 comprises a peripheral flow-off edge 12, at which the cooling air conveyed by the fan 9 flows away.

The generator 1 comprises a housing 13, in which the stator 2 is arranged. Adjacently to the end face 6 of the winding braid 3, the housing 13 comprises a housing wall 14, which is arranged radially outside the fan 9 so as to surround the fan concentrically. The housing wall 14 is formed as a wall arranged around the machine axis of the generator 1, a profiled member 16 being secured to the inner face of said wall by means of screws 15.

The profiled member 16 is annular and extends axially and radially inside the housing 13 from the housing wall 14, wherein the profiled member 16 is arranged between the end face 6 of the winding head 4 and the housing wall 14. The profiled member 16 is provided in the housing 13 in order to deflect the cooling air conveyed by the fan 9, wherein the profiled member 16 is produced from a plastic having a temperature resistance of more than 80° C.

Furthermore, the profiled member 16 is shaped such that the aerodynamically effective contour of the fan casing 6 at the flow-off edge 12 is continued in a substantially transition-free manner by means of said profiled member via an inlet profile portion 17, wherein the inlet profile portion 17 comprises an inflow rim 18 directly adjoining the flow-off edge 12. The inlet profile portion 17 of the profiled member 16 extends radially outwardly in a trumpet-shaped manner toward the winding head 4 in the direction of flow of the cooling air conveyed by the fan 9, wherein the cooling air is deflected radially outwardly by means of the inlet profile portion 17. On the side of the inlet profile portion 17 facing away from the inflow rim 18, the profiled member 16 comprises a deflector 19, by means of which the profiled member 16 protrudes axially farthest in the direction of the winding head 4. The end face 6 of the winding head 4 is arranged radially beyond the deflector 19.

A first baffle 20 and a second baffle 21 adjoin the deflector 19, form the contour of the profiled body 16 and run radially outwardly. The first baffle 20 and the second baffle 21 are arranged at an axial distance from the end face 6 and are based on the contour of the end face 6. In radial section, the winding head 4 protrudes axially from the involute 8 by means of a rectangle shape, wherein the end crown connection 7 is arranged in the corner of the rectangle shape protruding the farthest. The first baffle 20, which is arranged opposite a first surface portion 36 of the end face 6, and the second baffle 21, which is arranged opposite a second surface portion 37 of the end face 6, are guided around the end crown connection 7, whereby a bypass space 22 is formed at the end face 6 and the channel walls 21, 22. A first bypass space portion 23 of the bypass space 22 is formed by the first baffle 20 and a second channel bypass portion 24 of the bypass space 22 is formed by the second channel portion 21. An outlet profile 25 which is formed in a plate-shaped manner and perpendicularly to the machine axis of the generator 1, adjoins the profiled member 16 radially outwardly. Furthermore, the profiled member 16 comprises a rear face 26, which faces away from the inflow rim 18, the inlet profile portion 17, the deflector 19, the channel walls 20, 21 and also the bypass space portions 23, 24 and the outlet profile 25. On the rear face 26, the profiled member 16 is secured to the housing wall 14 by means of the screws 15.

The first bypass space portion 23 defines a width 27 via its distance from the end face 6, and the second bypass space portion 24 defines another width 28 via its distance from the end face 6. The widths 27, 28 therefore define the width of the bypass space 22. A total stream of cooling air 32 is conveyed as a cooling air stream by the fan 9 into the housing 13. The total stream of cooling air 32 is drawn in at the inlet 11 of the cooler casing 10 and flows off at the flow-edge 12 of the fan casing 10. The inflow rim 18 of the profiled member 16, which transitions in the direction of flow of the total stream of cooling air 32 into the inlet profile portion 17, is arranged directly at the flow-off edge 12. Since the inlet profile portion 17 widens outwardly, the total stream of cooling air 32 is provided with a radial speed component.

Some of the total stream of cooling air 32 penetrates the winding head 4 and the winding braid 3 as a penetrating partial stream 33. Since the winding braid 3 of the braid-like arrangement of the winding wires 5 is air-permeable, the penetrating partial stream 33 can penetrate the winding braid 3. This occurs however with the creation of flow losses, whereby the penetrating partial stream 33 is subject to a pressure drop as it flows through the winding braid 3. This is thus accompanied by an increase in the static pressure at the point of the winding head 4 at which the total stream of cooling air 32 contacts the winding head 4. In particular, a bypassing partial stream 34 is thus formed as a partial stream of the stream of cooling air 32 and enters the bypass space 22 at the deflector 19. The total stream of cooling air 32 thus divides into the penetrating partial stream 33 and the bypassing partial stream 34.

The bypassing partial stream 34 is guided in the first bypass space portion 23 to the end crown connection 7, whereas the bypassing partial stream 34 in the second bypass space portion 24 flows away from the end crown connection 7. If the bypassing partial stream 34 exits from the second bypass space portion 24, the bypassing partial stream 34 unites with the penetrating partial stream 33, which exits on the side of the winding braid 3 facing away from the end face 6. This unification of the penetrating partial stream 33 and the bypassing partial stream 34 occurs without any return flow, whereby eddying areas for example are eliminated at the winding braid 3.

The width 27 of the first bypass space portion 33 and the width 28 of the second bypass space portion 24 are selected such that the mass flow rates of the penetrating partial stream 33 and of the bypassing partial stream 34 are selected such that these partial streams 33, 34 are unified without any return flow. If, for example, the widths 27, 28 were not selected such that the partial streams 33, 34 are unified without any return flow, a return flow 35 would be produced at the winding braid 3, for example. The return flow 35 would constitute an eddying area, as a result of which the cooling of the winding braid 3 by the total stream of cooling air 32 is hindered.

The end crown connection 7 is cooled effectively as a result of the fact that the bypassing partial current 34 flows past and over the end crown connection 7 in particular in the bypass space 22. In addition, the winding braid 3 is penetrated uniformly by the penetrating partial stream 33, since the penetrating partial stream 33 flows away uniformly from the winding braid 3 as a result of the absence of the return flow 35 for example, which in accordance with the invention does not occur. Effective cooling of the winding braid 3 is thus achieved.

Figure 3:
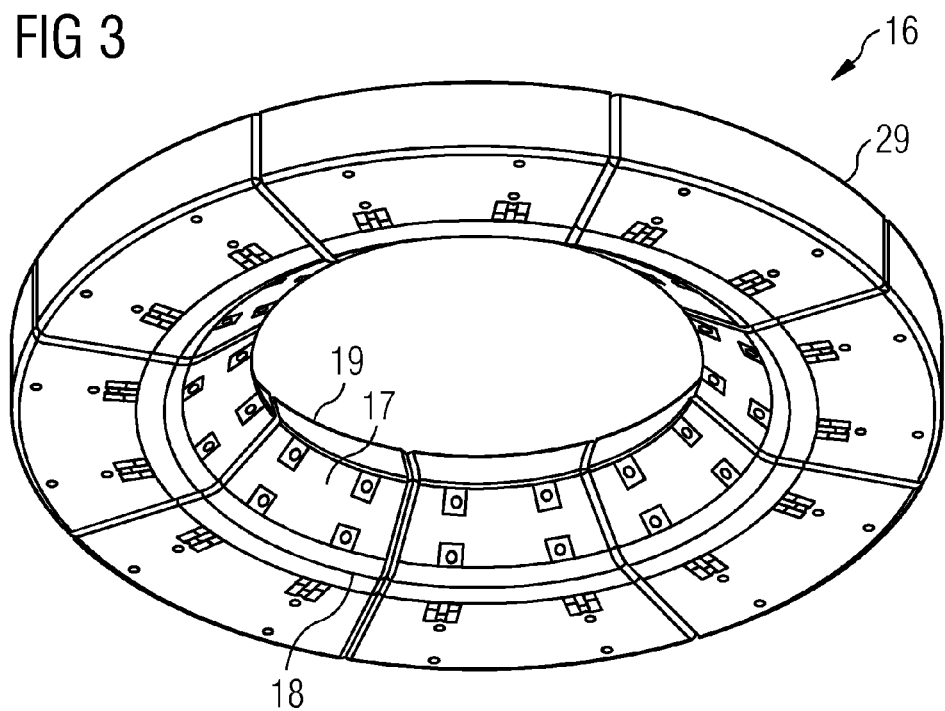
FIG. 3 shows a perspective illustration of the profiled member.
Figure 4:
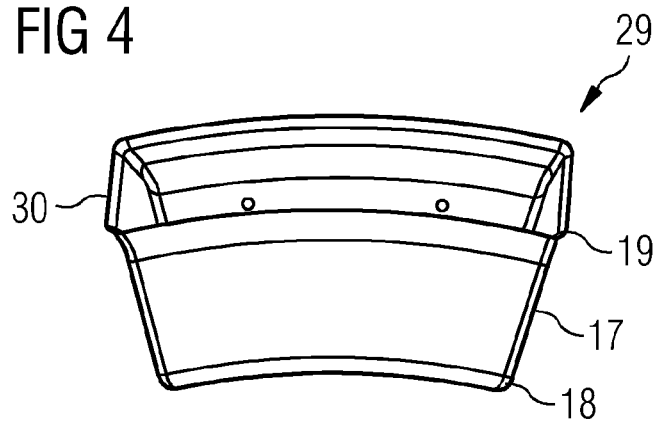
FIGS. 4, 5 show perspective illustrations of segment shells of the profiled member.
Figure 5:
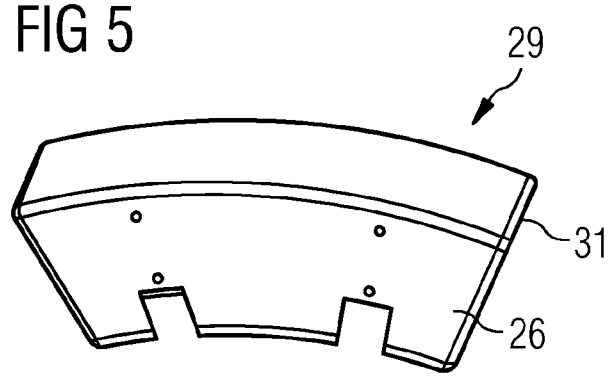
Figure 6:
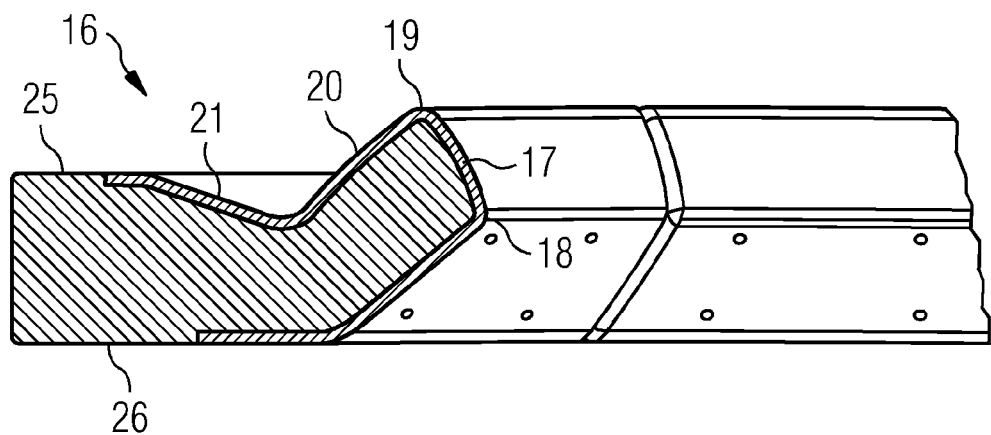
FIG. 6 shows a cross sectional detail of the profiled member.

The profiled member 16 is segmented as considered over the periphery, wherein, according to FIGS. 3 to 5, the profiled member is formed from eight segments 29. The profiled member 16 is hollow and the individual segments 29 are formed by segment shells 30, 31. The first segment shell 30 forms the inlet profile portion 17, the inflow rim 18, the deflector 19 the channel walls 20, 21, and also the outlet profile 25. The second segment shell 31 in particular forms the rear face 26. The design of the profiled member 16 with the segments 29, which are formed by the segment shells 30, 31, facilitates the assembly of the profiled member 16 in the housing 13.

The invention claimed is:

1. A cooling device for cooling an air-permeable winding braid of an electrical machine, comprising:
   a baffle; and
   a fan, which is arranged to blow a stream of cooling air substantially perpendicularly onto a first surface portion of a side of the winding braid,
   wherein, in the region of a second surface portion of the side of the winding braid, the second surface portion being arranged beside the first surface portion, the baffle is arranged substantially parallel to and at a distance from the surface of the second surface portion in such a way that a partial stream of the stream of cooling air is formed in a channel that is formed by the baffle and the second surface portion and therefore, on the side of the winding braid that faces away from the first-mentioned side, the other partial stream, penetrating the winding braid, of the stream of cooling air flows away from the winding braid without any return flow, and
   wherein the winding braid comprises an end crown connection, and the surface of the baffle is formed in such a way that the channel has a cross section minimum in the region of the end crown connection,
   wherein the fan comprises a fan casing, by means of which the fan is encased and in which the stream of cooling air is conveyed by the fan, and
   wherein the baffle comprises an inlet profile portion, which is arranged between the fan casing and the surface of the baffle facing the winding braid and widens radially outward in the direction of flow of the stream of cooling air from a flow-off edge of the fan casing, such that a partial stream of the stream of cooling air is deflected outward by the inlet profile portion and flows into the channel without transfer.

2. The cooling device as claimed in claim 1, wherein the contour of the surface of the baffle that faces the winding braid is approximately parallel to the contour of the second surface portion on the side of the winding braid.

3. The cooling device as claimed in claim 1, further comprising a profiled member, which comprises the baffle.

4. The cooling device as claimed in claim 3,
wherein the profiled member is annular.

5. The cooling device as claimed in claim 3,
wherein the profiled member is segmented over the periphery.

6. The cooling device as claimed in claim 5,
wherein the profiled member is divided in its axial direction.

7. The cooling device as claimed in claim 3, wherein the profiled member is produced from a plastic having a temperature resistance of more than 80° C.

8. A generator, comprising:
a stator; and
a cooling device as claimed in claim 1,
wherein a winding head of the stator comprises the winding braid.

9. The electrical machine as claimed in claim 8, further comprising a housing with the baffle.

10. A method for retrofitting an electrical machine with a cooling device as claimed in claim 1, the method comprising;
providing an existing electrical machine with a housing, a fan, which is arranged to blow a stream of cooling air substantially perpendicularly onto a first surface portion of one side of the winding braid, and a stator, wherein a winding head of the stator comprises an air-permeable winding braid; and
installing in the housing a profiled member comprising a baffle,
wherein, in the region of a second surface portion on a side of the winding braid, the second surface portion is arranged beside the first surface portion, the baffle is arranged substantially parallel to and at a distance from the surface of the second surface portion in such a way that a partial stream of the stream of cooling air is formed in the channel that is formed by the baffle and the second surface portion, and therefore, on the side of the winding braid that faces away from the first-mentioned side, a further partial stream, penetrating the winding braid, of the stream of cooling air flows away from the winding braid without any return flow,
wherein the fan comprises a fan casing, by means of which the fan is encased and in which the stream of cooling air is conveyed by the fan, and
wherein the baffle comprises an inlet profile portion, which is arranged between the fan casing and the surface of the baffle facing the winding braid and widens radially outward in the direction of flow of the stream of cooling area from a flow-off edge of the fan casing, such that a partial stream of the stream of cooling air is deflected outward by the inlet profile portion and flows into the channel without transfer.

11. The method as claimed in claim 10,
wherein the profiled member is secured to the housing.

* * * * *